US 8,553,680 B2

(12) United States Patent
Veenstra et al.

(10) Patent No.: US 8,553,680 B2
(45) Date of Patent: Oct. 8, 2013

(54) SERVICE CONTROLLING IN A SERVICE PROVISIONING SYSTEM

(75) Inventors: Pieter Koert Veenstra, The Hague (NL); Colin Alonso Pons, VC Rotterdam (NL)

(73) Assignee: Koninklijke KPN N.V., The Hague (NL)

( * ) Notice: Subject to any disclaimer, the term of this patent is extended or adjusted under 35 U.S.C. 154(b) by 930 days.

(21) Appl. No.: 12/428,897

(22) Filed: Apr. 23, 2009

(65) Prior Publication Data

US 2009/0268720 A1 Oct. 29, 2009

(30) Foreign Application Priority Data

Apr. 25, 2008 (EP) ..................................... 08007994

(51) Int. Cl.
*H04L 12/66* (2006.01)

(52) U.S. Cl.
USPC .......................................................... 370/352

(58) Field of Classification Search
None
See application file for complete search history.

(56) References Cited

U.S. PATENT DOCUMENTS

| | | | |
|---|---|---|---|
| 7,738,440 B2 * | 6/2010 | Riley et al. ..................... 370/348 |
| 2005/0190772 A1 * | 9/2005 | Tsai et al. ................. 370/395.52 |
| 2005/0273855 A1 * | 12/2005 | Oberle et al. ..................... 726/22 |
| 2006/0121916 A1 | 6/2006 | Aborn |
| 2006/0176876 A1 | 8/2006 | Aborn |
| 2006/0291484 A1 | 12/2006 | Naqvi et al. |
| 2007/0071200 A1 * | 3/2007 | Brouwer .................. 379/142.05 |
| 2007/0088836 A1 | 4/2007 | Tai et al. |
| 2008/0004061 A1 | 1/2008 | Takeda |
| 2008/0089290 A1 * | 4/2008 | Coulas et al. ................. 370/331 |
| 2008/0104696 A1 * | 5/2008 | Ll et al. ............................ 726/21 |
| 2008/0126541 A1 * | 5/2008 | Rosenberg et al. ........... 709/225 |
| 2008/0194258 A1 | 8/2008 | Chiu |

(Continued)

FOREIGN PATENT DOCUMENTS

| | | |
|---|---|---|
| EP | 1675347 | 6/2006 |
| GB | 2 432 748 A | 5/2007 |
| WO | 2005027459 | 3/2005 |
| WO | 2008/074348 | 6/2008 |

OTHER PUBLICATIONS

Jacobus A. Orphoff et al., "Privacy-Enhancing Call Management in an IP-based Infrastructure," Computing in the Global Information Technology, 2006, pp. 42-47, International Multi-Conference on Bucharest, Romania, Piscataway, N.J.

(Continued)

*Primary Examiner* — Otis L. Thompson, Jr.
(74) *Attorney, Agent, or Firm* — McDonnell Boehnen Hulbert Berghoff LLP (57) ABSTRACT

A method and a system is described for controlling a service in a service provisioning network. The method including the steps of: a serving network node associated with a user terminal receiving a registration message, the user terminal having one or more of services, preferably VoIP services; and, the serving network node retrieving in response to the registration message service routing information associated with the first user terminal, the service routing information being arranged to route service messages associated with the first user terminal via a stateless application server, the stateless application server being adapted to perform control actions on said service messages.

17 Claims, 5 Drawing Sheets

(56) References Cited

U.S. PATENT DOCUMENTS

| | | | |
|---|---|---|---|
| 2008/0215736 A1* | 9/2008 | Astrom et al. | 709/226 |
| 2008/0305792 A1 | 12/2008 | Khetawat | |
| 2009/0024760 A1* | 1/2009 | Saha et al. | 709/242 |
| 2009/0191873 A1 | 7/2009 | Siegel | |
| 2009/0193071 A1 | 7/2009 | Qiu | |
| 2009/0238174 A1 | 9/2009 | Veenstra et al. | |
| 2011/0265145 A1* | 10/2011 | Prasad et al. | 726/3 |
| 2012/0219127 A1* | 8/2012 | Lu et al. | 379/88.17 |

OTHER PUBLICATIONS

"Digital Cellular Telecommunications System (Phase 2+); Universal MObile Telecommunications System (UMTS); IP Multimedia (IM) Subsystem Cx and Dx Internfaces; Signaling flows and message contents (3GPP TS 29.228 version 7.8.0 Release 7)", Global System for Mobile Communications, ETSI Standards, LIS, Jan. 2008, pp. 1-63, vol. 3-Cn4, No. V7.8.0, Sophia Antipolis, Cedex, France.

Jul. 10, 2008 EPC Office Action in App No. 08007994.0—1244.

* cited by examiner

SERVICE CONTROLLING IN A SERVICE PROVISIONING SYSTEM

CROSS-REFERENCE TO RELATED APPLICATIONS

The present application claims priority to European Patent Application EP 08007994.0 filed in the European Patent Office on Apr. 25, 2008, the entire contents of which is incorporated herein by reference.

FIELD OF THE INVENTION

The invention relates to controlling a service in a service provisioning system, and, in particular, though not necessarily, to a method and a system for controlling a service in service provisioning system, wherein a user terminal connected to the service provisioning system comprises one or more services.

BACKGROUND

Current service providing network systems, such as the IP Multimedia Subsystem as developed by the Third Generation Partnership Project (3GPP), are designed to provide IP Multimedia over mobile communication networks (3GPP TS 22.228, TS 23.218, TS 23.228, TS 24.228, TS 24.229, TS 29.228, TS 29.229, TS 29.328 and TS 29.329). For fixed broadband services, such as Voice over IP (VoIP), the ETSI TISPAN working group is further developing IMS (TS 29.229: IP Multimedia Call Control Protocol based on SIP and SDP).

Within the IMS architecture the basic end-user subscription functions and the IP session management are decoupled from the specific VoIP service functions, e.g. number analysis, CLIP/R, Call Waiting, Call Barring, Call Waiting, etc. These services are handled within one or more application servers which reside in the network. IMS, which makes use of the Session Initiation Protocol (SIP) to set up and control client-to-client call services and client-to-server call services, provides the delivery of reliable VoIP services which meet the requirements regarding Quality of Services (QoS) and the regulatory demands for routing, privacy, security and legal interception.

Although IMS enables a large amount of multimedia services, it also has disadvantages, especially within the context of VoIP. Within the IMS standard, VoIP is only described in combination with the use of application servers in the network to maintain call state and offer the voice service features. The application servers hosting the VoIP services require user-specific configuration data for each service. Conventional IMS application servers are required to be involved in the call session for the complete duration of the call to maintain call state and will cause a substantial amount of SIP messaging to be exchanged between the various clients and servers involved. The capacity of an application server is dependent on the number of subscribers to the services, while the capacity of the IMS system scales with the volume of data traffic. Hence, the dimensioning of the network resources in such conventional IMS system is complex and based on forecasts of the VoIP service behaviour of the users is needed.

One way of solving these problems is an IMS-based call handling architecture wherein a predetermined number of the VoIP call services, which normally reside in the network, are located in the user terminals connected to the IMS. Such architecture, which hereafter will be referred to as the "flat" IMS architecture, is described in European patent application no. 080053937, which is hereby incorporated by reference into this application.

Within the flat IMS architecture, the initial Filter Criteria (iFC) in the user service profile of the Home Subscriber Server (HSS) may comprise information which determines whether or not a SIP message should be routed to a service located in a particular application server. The iFC may be defined according to the standard in paragraph B.2.2 of document TS 129 228, which is hereby incorporated by reference in this application. An iFC may comprise a Trigger Point, i.e. a Boolean flag determined by a set of conditions and the SIP URI of an application server the SIP request should be routed to in case of a received SIP message fulfils the condition(s) set by the Trigger point (Trigger point is TRUE). In case the Trigger point is FALSE, the SIP message will not be routed to the application server comprising the service identified in the iFC.

Hence, the iFC may be defined in such a way that a user terminal may be prevented from registering to services located in the application servers of the IMS which correspond to the call services present in the user terminal. This may be realized by setting the Trigger Point in the iFCs associated with the VoIP call services corresponding to the call services in the UE to FALSE. Hence, after registration, the iFCs in the service profile may determine the S-CSCF to route SIP messages via one or more application servers only when these application servers host services which are not present or active in the user terminal.

Figure 1:
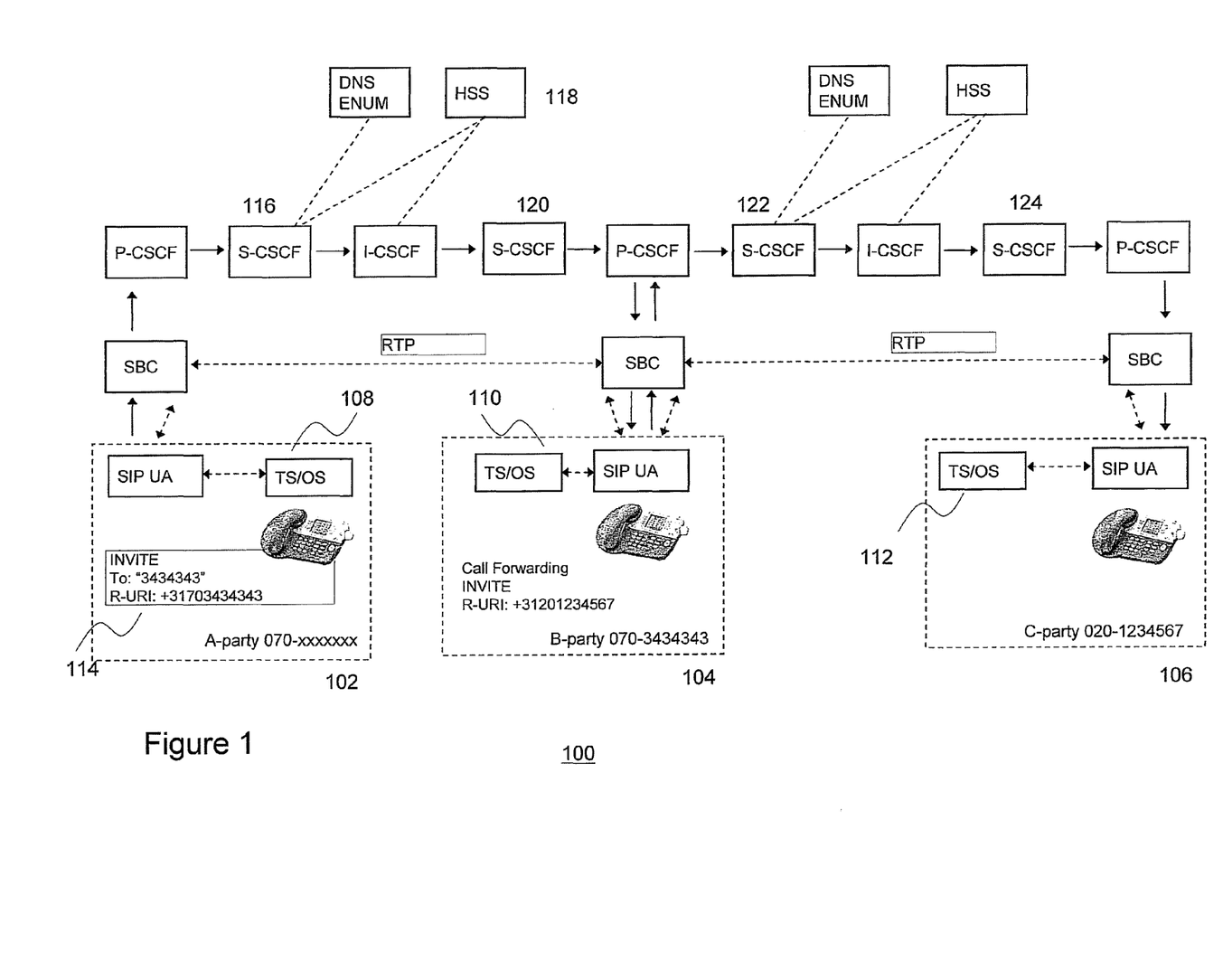
FIG. 1 depicts a schematic flow diagram of forwarded call in a flat IMS architecture.

FIG. 1 depicts an exemplary flow diagram 100 of a VoIP call session in a flat IMS architecture, which includes the activation of a Call Forwarding service.

The core of the IMS may be formed by the conventional Call/Session Control Functions (CSCF) comprising amongst others a Proxy-CSCF (P-CSCF), an Interrogating-CSCF (I-CSCF) and a Serving-CSCF (S-CSCF). A first user terminal UE-A 102, a second user terminal UE-B 104 and a third user terminal UE-C 106 may comprise a predetermined number of originating VoIP services (OS) and/or terminating VoIP services (TS) (108,110,112) connected to a SIP client. Each user terminal may be registered with the flat IMS. Upon registration the user profile associated with each user terminal may instruct its serving S-CSCF not to route SIP messages via application servers for all services or at least one or more services which are already present in the user terminal. For each of these services the Trigger Point in its associated iFC may be set to FALSE.

The call session depicted in FIG. 1 starts with the first terminal UE-A 102 receiving a request for a call. Such request may be initiated e.g. by the user dialing a local number 3434343 of the second user terminal UE-B. The request triggers a service 108 residing in UE-A, e.g. a VoIP number normalization service. This service generates a normalized number of the user terminal UE-B, which is subsequently inserted as a R-URI in the header of the SIP INVITE message 114 generated by the SIP client of UE-A. The SIP message is then routed via a Session border Controller (SBC) and the P-CSCF to the S-CSCF 116 serving the first user terminal UE-A.

On the basis of the user profile retrieved from a Home Subscriber Server (HSS) 118 the S-CSCF may directly forward the SIP message to the I-CSCF of user terminal UE-B using ENUM and DNS. No routing to an VoIP application server takes place. Similarly, the S-CSCF 120 of the second user terminal UE-B 104 may directly route the SIP INVITE message to the SIP client of user terminal UE-B without addressing the one or more application servers connected to the IMS comprising the call services in the second user terminal UE-B. In response to the reception of the SIP message, a Call Forward service 110 located in the user terminal UE-B may be executed. The SIP client of UE-B thereafter sends the SIP INVITE message with the R-URI identifying the third user terminal UE-C (in this case a telephone number+ 31201234567) to the S-CSCF 122 serving UE-B.

In response, the S-CSCF 122 serving UE-B may identify the I-CSCF of the third user terminal UE-C using ENUM and DNS and directly forwards the SIP INVITE message via the I-CSCF to the S-CSCF serving UE-C 124, which subsequently forwards the SIP INVITE message on the basis of the user profile of UE-C to the SIP client of UE-C 106.

User terminal UE-C may confirm the establishment of a call session between UE-C and UE-B by sending a SIP response message, typically a SIP 200 OK message, back to UE-B and UE-B may confirm the establishment of the call session between UE-A and UE-B by sending a SIP 200 OK message back to UE-A (not shown in FIG. 1). In this way, a call session between UE-A and UE-C is established wherein the voice data are communicated over the connection using e.g. the RTP protocol.

Hence, service provisioning in the flat IMS architecture results in a significant signaling load reduction in the network, especially with regard to the IMS core and the application servers. It thus allows a very low cost solution of VoIP services. Within the flat IMS architecture however certain problems regarding service control may still be present.

In a conventional IMS the SIP client of UE-A inserts the identity of user terminal A in the FROM field of the SIP message header. The receiving SIP client of UE-B may present this identity as a Calling Line Identity to the called user of UE-B. The called user may trust this identity as being controlled by the logic of a VoIP application server of the serving telecom operator.

Furthermore, in a conventional IMS it is the service logic of a VoIP application server in the network that performs the forwarding actions to a further user terminal UE-C. In that case the VoIP service assumes separate call legs. For a call being forwarded, the first call leg is defined by the call between UE-A and UE-B and the second call leg is defined by the call between UE-B and UE-C, wherein the user of UE-A typically pays for the first call leg and the user of UE-B pays for the second call leg. Hence in a conventional IMS it is the service logic of a (VoIP) application server in the network that maintains the call state of the call between UE-A and UE-B and, between UE-B and UE-C.

In an IMS architecture wherein part of the VoIP services reside in the end-terminals however the identity of user terminal UE-A cannot be guaranteed as the content of the FROM field will be passed on transparently. As a result, the identity of UE-A may be changed by mistake or manipulated for fraud reasons and the user terminal UE-B can be mislead.

Figure 2:
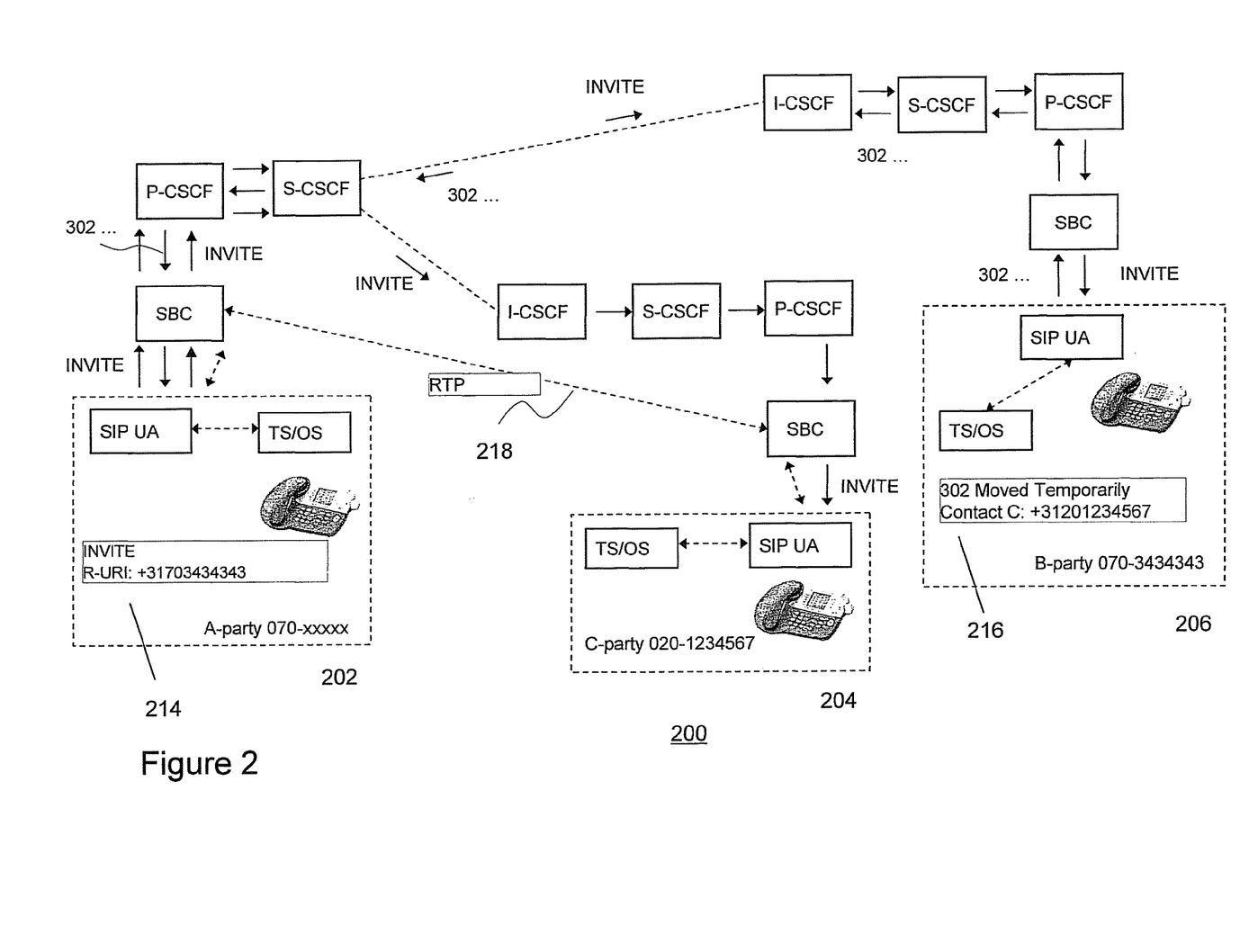
FIG. 2 depicts provides a schematic flow diagram of another forwarded call in a flat IMS architecture.

Moreover, forwarding actions will be performed by the SIP client EU-B located in the user terminal B. Hence, UE-B may reject an incoming call with a SIP response message, e.g. a SIP 302 Moved Temporarily message. This is illustrated by the flow diagram 200 of FIG. 2. Similar to the flow diagram in FIG. 1, a SIP INVITE 214 is sent by the SIP agent of user terminal UE-A 202 to the SIP agent of user terminal UE-B 206. In response to the SIP INVITE UE-B sends a SIP 302 Moved Temporarily message 216 back to UE-A. The SIP 302 response message instructs the UE-A to set-up a direct call session 218 between UE-A and UE-C. This redirection is out of the control of the user of UE-A and may lead to the situation that the user of UE-A is billed for the call to the forwarded call to user terminal UE-C. This may lead to unwanted payments, especially when the user terminal UE-C is a highly priced 900-number. Moreover, user terminal UE-B may return an error response code whereby user terminal UE-A becomes uncontrollable for its user.

SUMMARY

It is an object of the invention to reduce or eliminate at least one of the drawbacks of the flat IMS architecture. In a first aspect the invention may relate to a method of controlling a service in a service provisioning network wherein the method may comprise the steps of: a serving network node associated with a user terminal receiving a registration message, said user terminal comprising one or more of services, preferably VoIP services; and/or the serving network node retrieving in response to the registration message service routing information associated with the first user terminal, the service routing information being arranged to route one or more service messages associated with said first user terminal via a call stateless application server, wherein said call stateless application server is adapted to perform one or more control actions on said service messages.

The invention may further relate to a method of handling integrity of a service in a service provisioning network, such as an IP Multimedia Subsystem (IMS). The method may comprise the steps of: a serving network node associated with a user terminal, e.g. a S-CSCF serving a user terminal, receiving a registration message such as a SIP register message, said user terminal comprising a one or more services, such as call services VoIP services; and, said a serving network node retrieving in response to the registration message a user service profile associated with the first user terminal, the user service profile comprising one or more initial Filter Criteria (iFC) arranged to route one or more service messages, such as SIP messages, via a call stateless application server, wherein the server is configured managing the integrity of the service messages and/or controlling the service messages during the establishment of a service session, e.g. a call session.

In order to manage the integrity of the SIP messages the stateless application server does not require registration of user-specific configuration data for each service and thus provides simple service controlling operation, similar to P-CSCF standardized behaviour. Further, the inclusion of a stateless application server in a flat IMS architecture will not introduce scaling problems, as the capacity of a stateless application server only depends on traffic volumes and is not dependent on the number of subscribers to the IMS.

In a further embodiment the user service profile further may comprise one or more initial Filter Criteria (iFC) arranged to prevent registration of the user terminal to one or more application servers connected to the service provisioning network, wherein said application servers comprise one or more services corresponding to one or more services in the terminal. Configuring the iFCs of the user terminal according to the services present in the user terminal results in a significant signaling load reduction in the network, especially with regard to the IMS core and the application servers. Such IMS-based call handling architecture thus allows a very low cost solution of VoIP services.

In yet a further embodiment each initial Filter Criteria (iFC) may comprise one or more Trigger Points and wherein the Trigger Point of an iFC associated with a service corresponding to one of the services in the user terminal is set to FALSE.

In one embodiment the user service profile may further comprise one or more initial Filter Criteria (iFC) arranged to route all SIP messages for establishing a session associated with a service, e.g. a call session, via the stateless application server. In a further embodiment the routing of said SIP messages may be terminated if the S-CSCF has received a SIP response, preferably a SIP 200 OK message, acknowledging the establishment of the call session. The control actions of the stateless application server, may only be required during the establishment of a session associated with a requested service. Once the called party acknowledges the establishment of a session, e.g. with a SIP 200 OK response, there is no further need for the stateless application server to be involved in the session. As a result resource utilization will be far more efficient when compared to the use of a conventional VoIP application server.

In a further embodiment the stateless application server may initiate a control action in response to the receipt of a SIP message from a predefined group of SIP messages. In one embodiment the stateless application server may be triggered to perform a control action if a service message received by the stateless application server matches a service message listed in a predefined list of service messages. In one variant said list may be stored in a memory of said stateless application server. In another variant said list may be stored in a database connected to said stateless application server.

In a further variant said list of service messages may comprise one or more SIP response messages, preferably one or more redirection messages and/or one or more error messages, more preferably one or more SIP response messages from the SIP response code class 3xx and/or from the SIP response code class 5xx.

The stateless application server may only triggered by one of the SIP messages of a predefined group of SIP messages and it does not require information about the state the session is in nor the state of a call transported in said session. Hence, the control action is implemented in simple trigger-response model which can be easily modified by changing the "triggers", i.e. the group of SIP messages, to which the server should respond to.

In one embodiment said control action may comprise the step of checking whether said service message comprises an allowable destination. In another embodiment said control action comprises the step of checking whether the destination in said service message is listed in a whitelist or a blacklist stored in the memory of said stateless application server or stored in a database connected to said stateless application server. In yet another embodiment said control action may further comprise the step of initiating a session by a SIP Request message, preferably a SIP INVITE message, in response to a received SIP redirect message. In another embodiment said control action may further comprise the step of replacing SIP redirect message by a SIP response message from the response code class 4xx.

In a further variant, the control action may further comprise the step of the SAS acting as a Back-To-Back (B2BUA) user agent. On the basis of the information in the header of the SIP redirection message (e.g. the URL of a user terminal identified in the SIP 302 message) the B2BUA may act as an endpoint for the communication session associated with a SIP redirection message and may initiate a new session to the redirection target and mediates all SIP signaling between both ends of the call. Using such control steps the SAS may efficiently prevent redirection to highly priced 900-numbers and/or other unauthorized services and terminate the call session in a controlled way.

In another embodiment the control action may comprise the step of the stateless application server checking in response a SIP request message the caller identity of the originating call by comparing the FROM field with P-Asserted-Identity field in the header of the SIP message. In one embodiment the stateless application server may use the contents of the P-Asserted-Identity header field to be copied in the FROM header field. The P-Asserted-Identity header field is inserted by the P-CSCF into the header of SIP messages. The P-Asserted-Identity is used among trusted SIP entities to carry the identity of the user sending a SIP message as it was verified by authentication thus serving as a reliable and trustable information for checking the identity of the caller.

In one embodiment the control action may comprise the step of the stateless application server preventing in response to a SIP response message, preferably a SIP 302 Moved Temporarily message, the SIP response message from being routed to the user terminal. Blocking SIP response messages, e.g. a SIP 302 Moved Temporarily response message, from a called user terminal may prevent the establishment of unwanted call session, which is out of the control of the calling user terminal and which may lead to unwanted billing of the call.

In a further embodiment the stateless application server may send a SIP request, preferably a SIP INVITE message, to a further user terminal identified in the SIP response message. By sending a SIP INVITE to the user terminal to which the call is forwarded to, the stateless application server is capable of maintaining the integrity of the separate call legs between the calling user terminal and the called/forwarding user terminal and between the called/forwarding user terminal and the user terminal to which the call is forwarded. This way unwanted billing may be avoided.

In a further aspect the invention may relate to a stateless application server for use in an IP Multimedia Subsystem (IMS). The application server may be configured to manage the integrity of SIP messages and/or control the service messages during the establishment of a call session, the server comprising: means for receiving a SIP message from a S-CSCF serving a user terminal, the user terminal comprising a predetermined number of call services, preferably VoIP services; and, means for initiating a control action in response to the receipt of a SIP message from a predefined group of SIP messages, preferably the group comprising at least a SIP INVITE message and/or a SIP 302 Moved Temporarily message.

In one embodiment the stateless server may comprise means for checking whether a service message comprises an allowable destination. In another embodiment said control action may further comprise the means for initiating a session by a SIP Request message, preferably a SIP INVITE message, in response to a received SIP redirect message. In yet another embodiment the server may comprise means for replacing a SIP redirect message by a SIP response message from the response code class 4xx, such as a SIP 480 message.

In an embodiment the stateless application server may further comprise: means for checking the caller identity of the originating call by comparing the FROM field with P-Asserted-Identity field in the header of the SIP message; and, means for copying the contents of the P-Asserted-Identity in the FROM field.

In another embodiment the stateless application server may further comprise: means for preventing a SIP response message, preferably a SIP 302 Moved Temporarily message, from being routed to the user terminal; and, means for sending a SIP request, preferably a SIP INVITE message, to a further user terminal identified by the URL in said response message.

In yet another aspect the may invention relate to a system for controlling service messages in a service provisioning network, preferably comprising an IP Multimedia Subsystem (IMS), wherein the service provisioning network may be connected to at least one user terminal, wherein the user terminal may comprise one or more services, preferably VoIP services and wherein said service provisioning network may be further connected to a stateless application server as described in the embodiments above.

The invention may also relate to a computer program product for controlling service messages in a service provisioning network, preferably comprising an IP Multimedia Subsystem (IMS), the computer program product comprising software code portions configured for, when run on one or more network nodes in said service provisioning network, executing the method steps as described in the embodiments above.

The invention will be further illustrated with reference to the attached drawings, which schematically show embodiments according to the invention. It will be understood that the invention is not in any way restricted to these specific embodiments.

DETAILED DESCRIPTION

Figure 3:
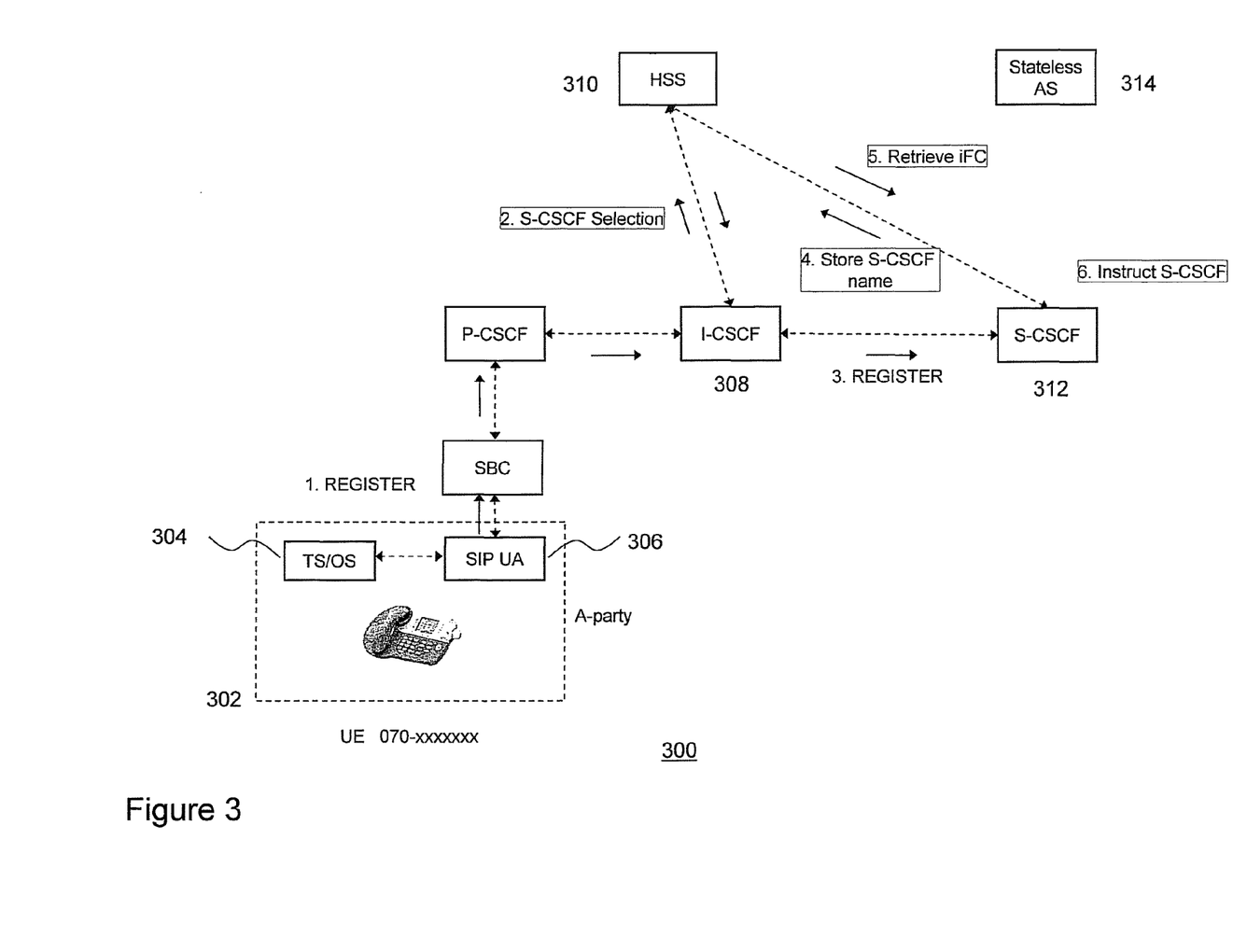
FIG. 3 depicts a schematic flow diagram of an exemplary embodiment of the invention.

FIG. 3 depicts a schematic flow diagram 300 of an exemplary embodiment of the invention. A first user terminal (EU) 302 may comprise a SIP client 306 (also referred as a SIP User Agent or SIP UA) and functional unit 304, comprising one or more number of originating, intermediate and/or terminating services, preferably VoIP specific services, e.g. number normalization, Caller ID Blocking, Call Forwarding (conditional, no answer, busy), Calling Line Identification Presentation (CLIP), VoiceMail, Call Return Busy Destination, Call Waiting, Conferencing, Call Hold, etc. Alternatively, the services may be multimedia services, such as (interactive) television, Content on Demand or videophone services. In general, the invention may apply to all services that may be made available to users through application servers. Other types of services include virus scanning, parental control functionality and/or firewall or proxy services.

These services may be implemented in the terminal as one or more software programs executed by a processor in the memory of the terminal, as hardware (e.g. one or more chipsets providing the desired service) or a combination of hardware and software.

The user terminal may be an IP telephone or, alternatively, the user terminal may be "soft" IP phone, i.e. a computer program executed on a personal computer, a personal digital assistant (PDA) or a smart phone providing the functionality of the telephone. In case of services related to multimedia services, the user terminal may be a device capable of providing multimedia services to the user, such as television, a combination of a television and a set-top box or a home gateway.

In order to execute the software programs the terminal may comprise an Operating System (OS) for managing the resources of the terminal, e.g. one or more Central Processing Units (CPUs), memory for storing program instructions and data and Input/Output (I/O) devices such as a radio module for providing wireless access to the network. Further, the OS may comprise Application Programming Interfaces (AIPs) through which one or more application programs may access services offered by the OS. The OS may comprise AIPs for setting up wired and/or wireless connections to a communications network, such as an IMS network.

FIG. 3 schematically depicts a registration process of the user terminal UE to a flat IMS system, which is capable of managing the integrity of the SIP messages during the establishment of a call session. The registration process may be started by the user terminal UE sending a registration messages, e.g. a SIP REGISTRATION message, via the SBC and the P-CSCF to the I-CSCF 308 (step 1). The I-CSCF selects on the basis of the information provided by the HSS 310 a suitable S-CSCF (step 2). The registration message may then be forwarded to the S-CSCF 312 serving UE for authenticating the user (steps 3 and 4).

After authentication of the user, the S-CSCF may inform the HSS that the user has been successfully registered. In return the HSS may provide the S-CSCF with service routing information which may be contained in or associated with the service profile of the user (step 5). On the basis of the service routing information, the S-CSCF may register the user with one or more services in the one or more application servers by sending a register message (such as a SIP REGISTER message) to the application servers identified in the service routing information. The services may be identified by a set of initial filter criteria (iFC) in or associated with the user service profile.

An iFC may be generally regarded as service routing rules comprising a filter part and a decision part, wherein the filter part comprises so-called Trigger Points, defining one or more filter criteria which are applied to the incoming service message. The decision part specifies the action(s) to be taken when the incoming message matches with the filter criteria of the rule. The iFC thus comprised information for determining whether or not a SIP message should be routed to a service located in a particular application server. The iFCs are defined in the standard in paragraph B.2.2 of document TS 129 228, which is hereby incorporated by reference in this application. An iFC may comprise one or more Trigger Points, i.e. Boolean flags determined by a set of conditions to be met by the SIP request, and one or more SIP URIs of application servers the SIP request should be routed to in case the Trigger Point is TRUE. In case the Trigger Point is FALSE, it will not be routed to the application server comprising the service identified in the iFC.

According to the present invention the scripts in the iFCs of the user service profile of UE may instruct the S-CSCF to route messages to a stateless application server 314 which manages the control of the SIP messages during the establishment of a call session (step 6). In one embodiment this may be achieved by setting the Trigger Point in the iFCs associated with the stateless application server to TRUE.

The stateless application server (SAS) is adapted to perform one or more control actions on service messages (i.e. messages, such as SIP messages, associated with a service session) it receives. In particular, the SAS may be configured to take action upon service messages which may result in undesired situations such as redirection messages leading to undesired call sessions and/or error messages which cause a user terminal to become uncontrollable. Such messages may include SIP messages from the SIP response code class 3xx regarding redirection of a request to another location and SIP response code class 5xx defining error messages indicating that a request was not completed due to error in recipient and that a request is to be tried at another location.

To that end the SAS may comprise a pre-configured list or table comprising service messages. Such service message table may be stored in a memory of the SAS. In a further variant, the service message table may be stored in a database connected to the SAS. If a received service message matches a service message in the table, the SAS may trigger a control action. Hence, the SAS does not require information about the state the call is in. The SAS treats each SIP message it receives as a SIP message which is independent of subsequent messages or earlier received messages. Hence, the SAS can be session aware but does not rely on the maintenance of state (i.e., information about the state of the end-to-end communication, which is the responsibility of end nodes such as UE and an application server), thereby adhering to RFC 1958.

In response to a trigger, the SAS may initiate a control action. For example for integrity control, it may replace and/or amend certain fields in the header field of the SIP message. In a further embodiment, in response to the trigger, the SAS may act as a Back-To-Back (B2BUA) user agent, by acting as endpoint for the communication session associated with a SIP redirection message and initiating a new session to the redirection target and mediates all SIP signaling between both ends of the call. In yet a further embodiment, in response to the trigger the SAS may disconnect itself from the S-CSCF serving a user terminal. Hence, the SAS allows simple implementation of control actions in the service provisioning network, such as an integrity control action and/or a call leg control action, by amending information in the service message and/or by initiating a B2BUA (e.g. a B2BUA as defined in RFC3261). These control actions are implemented in a simple trigger-response model, which may be easily modified by changing the "triggers", i.e. the group of SIP messages, to which the server should respond to. The advantages of the use of such stateless server will be become more apparent from the examples as described hereunder with reference to FIGS. 4 and 5.

In a further variant, step 6 in the process as described in FIG. 3, may further include service routing information, for example in the form of one or more scripts in the iFCs of the user service profile, instructing the S-CSCF to only register with the application servers hosting the services which are not present and/or active in the user terminal UE. In one embodiment, prevention of registration of these services may be achieved by setting the Trigger Point in the iFCs associated with the services corresponding to the services in the UE (e.g. VoiP or multimedia services) to FALSE. Hence, after registration, the service routing information may determine the S-CSCF to route SIP messages via the SAS and, optionally, via one or more application servers which host services which are not present and/or active in the user terminal UE.

Figure 4:
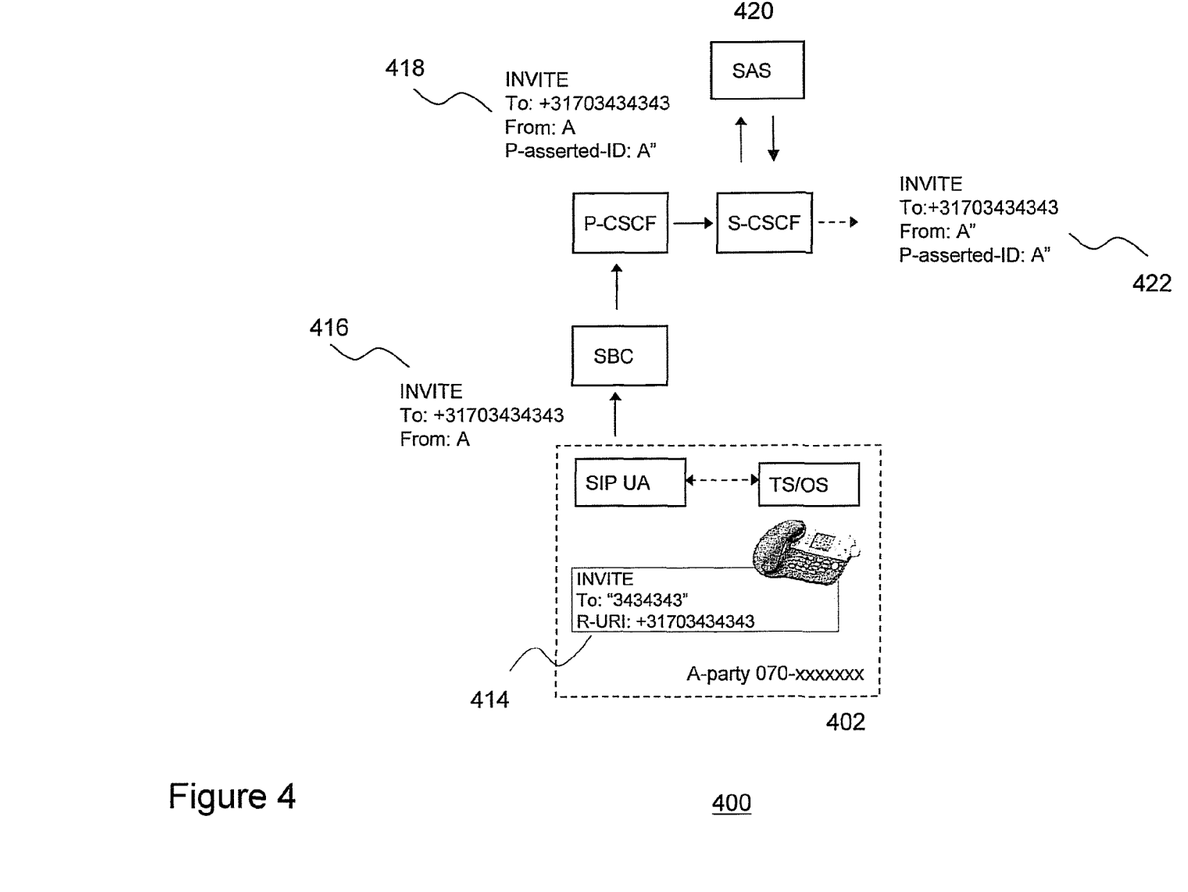
FIG. 4 depicts a schematic flow diagram of another embodiment of the invention.

FIG. 4 depicts a flow diagram 400 of a further embodiment of the invention. In this embodiment the process may be started by the UE 402 sending a SIP INVITE 414 to another user terminal in order to establish a call session. In the header of the SIP message 416 the FROM field comprises a URI identifying the user terminal. The URI may be inserted in the FROM field by the SIP agent in the user terminal UE and may be used by the called user terminal to identify the caller. The SIP INVITE message may be sent via the P-CSCF to the S-CSCF serving user terminal UE. The P-CSCF, which authenticates the user terminal UE, may subsequently insert a P-Asserted-Identity header field into the SIP INVITE message 418.

The P-Asserted-Identity header field is used among trusted SIP entities, such as two or more user terminals registered to an IMS, to carry the identity of the user sending a SIP message as it was verified by authentication. The P-Asserted-Identity header field is described in more detail in IETF Specs RFC 3325, which are hereby incorporated by reference into the application.

Thereafter the SIP INVITE is sent to the S-CSCF, which forwards the INVITE message on the basis of the iFCs to a stateless application server 420 which is configured to take action upon reception of a SIP INVITE message. The SIP INVITE message triggers the stateless application server 420 and—in response—the stateless application server 420 copies the contents of the P-Asserted-Identity header field into the FROM field 422 thereby providing guarantee to the called party about the identity of the party making the VoIP call. Normally the FROM field and the P-Asserted-Identity field should match. Differences may be caused by manipulation or an error. Hence, in this embodiment the stateless application server may perform a simple control action, in particular an integrity control action, by copying the P-Asserted-Identity in the FROM field.

Figure 5:
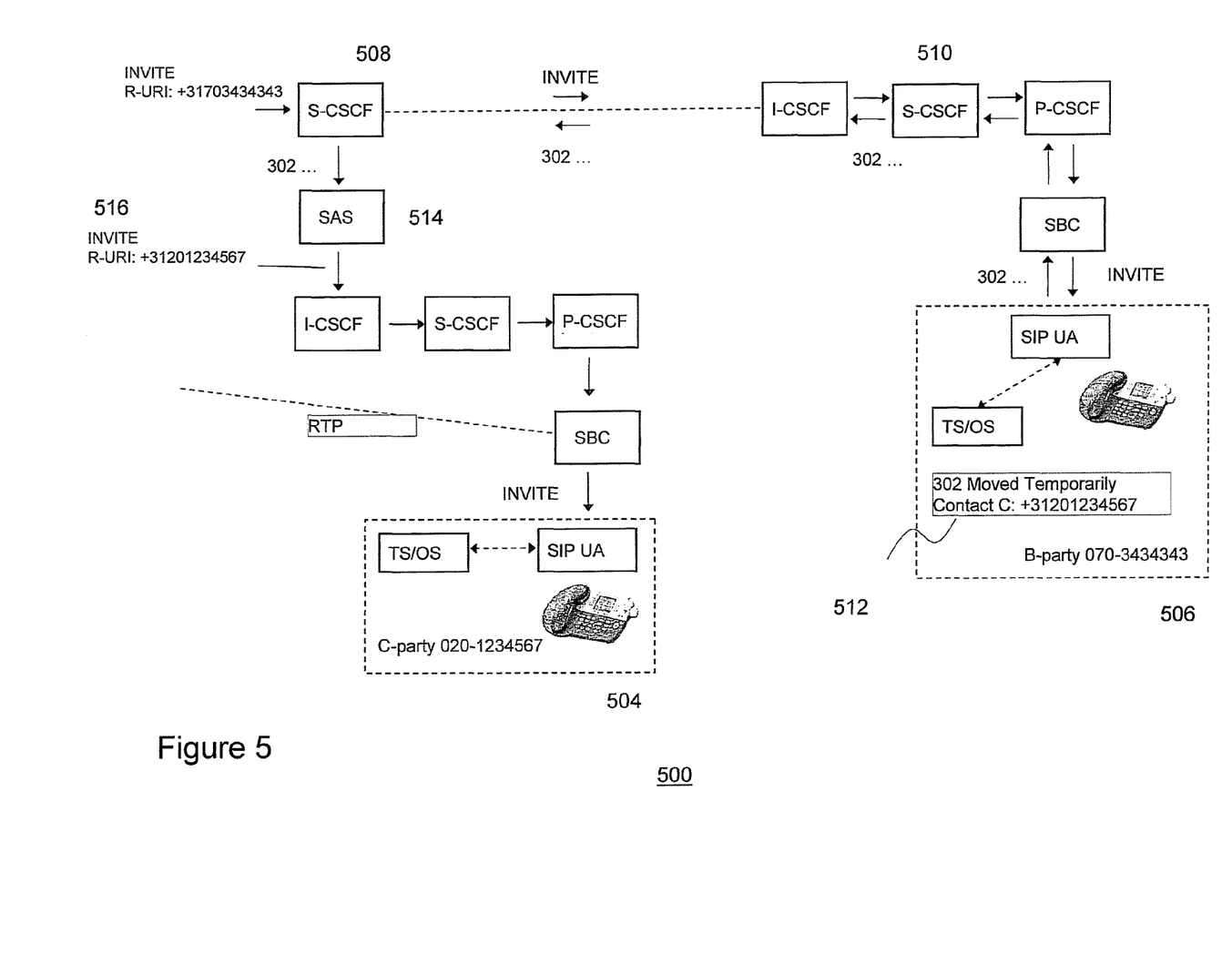
FIG. 5 depicts a schematic flow diagram of yet another embodiment of the invention.

FIG. 5 depicts a flow diagram 500 of a further embodiment of the invention. The flow diagram is similar to the one described in relation with FIG. 2. In FIG. 5 however the S-CSCF 508 serving user terminal EU-A may now be connected to SAS 514, which is capable of performing one or more control actions on SIP messages received by the SAS during the establishment of a call session as described with reference to FIGS. 3 and 4.

In the example of FIG. 5, the control action of the SAS is triggered by a SIP 302 redirect message (i.e. a SIP response message). The SIP 302 message 512 originating from user terminal EU-B is sent to the S-CSCF serving user terminal EU-A 508, which forwards the SIP 302 message on the basis of the iFCs to the SAS. The SIP 302 Moved Temporarily message, triggers the SAS 514 to perform a control action.

In one embodiment, the SAS may initiate the control action by checking whether the contents of the destination field (i.e. the Contact C field) of the SIP redirect message is listed in a white list, i.e. a list of allowable destinations. Alternatively, in another embodiment the SAS may check whether destination field of the SIP redirect message is listed in a blacklist, i.e. a list of not allowable destinations. The lists of allowable and/or non-allowable destinations may be stored in the memory of the SAS or, alternatively, in a database connected to the SAS.

If it is established that the destination is an allowable destination, in embodiment the SAS may continue the control action by acting as a Back-To-Back (B2BUA) user agent. On the basis of the information in the header of the SIP redirection message (e.g. the URL of a user terminal identified in the SIP 302 message) the B2BUA may act as an endpoint for the communication session associated with a SIP redirection message and may initiate a new session to the redirection target and mediates all SIP signaling between both ends of the call This process is illustrated in FIG. 5. Instead of passing the SIP 302 response message to the user terminal UE-A, the SAS may act as a B2BUA agent 514 which acts as a terminating network node for the SIP UE of the B-party 512 and an originating network node for the SIP UE of the C-party 504. The B2BUA may send a SIP INVITE 516 to user terminal UE-C as identified by the URL in the SIP 302 response message, thereby establishing a direct call leg between user terminal UE-A and user terminal UE-C, so that the users involved in the call session are correctly billed.

If it is established that the destination is not an allowable destination (not shown in FIG. 5), the SAS may continue the control action by replacing a first SIP response message, preferably the SIP redirect message (e.g. the SIP 302 message), by a second SIP response message, preferably a SIP response message from the response code class 4xx regarding client failure responses (e.g. a SIP 480 Temporarily Unavailable message) and subsequently returning the second SIP message to user terminal UE-A on the basis of information in the header of the first SIP message (e.g. the URL of user terminal UE-A identified in the FROM header in the SIP 302 message). This way the SAS may efficiently prevent redirection to highly priced 900-numbers and/or other unauthorized services and terminate the call session in a controlled way.

Further, the stateless server 514 may be triggered by a SIP 200 OK response message. Such message indicates that a call session between an originating party and a termination party is successfully established. In that case, there is no need for the SAS to be further involved in the call session so that the SAS may be disconnected from the S-CSCF serving user terminal UE-A until a new call session is initiated. As a result, resource utilization will be reduced when compared to the situation wherein a conventional VoIP application server is used to perform control actions.

It is to be understood that any feature described in relation to any one embodiment may be used alone, or in combination with other features described, and may also be used in combination with one or more features of any other of the embodiments, or any combination of any other of the embodiments. For example, in further embodiments, not all user terminals in the call session require call services to be present in the user terminal. For example the third user terminal UE-C in FIG. 5 may be a conventional user terminal having a serving S-CSCF which routes the SIP messages via one or more services (e.g. VoIP and/or multimedia services) located in one or more application servers connected to the IMS core. Other variants include methods and systems wherein the number and/or type of services in the one or more user terminals may different, as it is the user profile associated with each user terminal which determines whether or not a specific service is included in the routing of the SIP messages. Further, the invention is not limited to IMS but may also be implemented in a 3GPP Long Term Evolution (LTE) or 3GPP Service Architecture Evolution (SAE) networks. Moreover, the invention is not limited to the embodiments described above, which may be varied within the scope of the accompanying claims.

The invention claimed is:

1. A method of controlling a service in a service provisioning network, the method comprising:
    a serving network node associated with a user terminal receiving a registration message, said user terminal comprising one or more VoIP call services;
    the serving network node retrieving, in response to the registration message, service routing information associated with the first user terminal, the service routing information being arranged to route at least one service message associated with said first user terminal via a stateless application server, said stateless application server being adapted to perform at least one control action on said service message,
    wherein the stateless application server is triggered to perform a control action if a service message received by the stateless application server matches a service message listed in a pre-configured list of service messages, said list being stored in a memory of said stateless application server or in a database connected to said stateless application server.

2. The method according to claim 1, wherein said service routing information further being arranged to selectively prevent registration of the user terminal to one or more application servers connected to the service provisioning network, said application servers comprising one or more services corresponding to the services comprised in said user terminal.

3. The method according to claim 1, wherein said service routing information is further arranged to route one or more SIP messages via said stateless application server, said SIP messages being arranged for establishing a session associated with a VoIP service.

4. The method according to claim 1, wherein said service routing information comprises initial Filter Criteria (iFC), each iFC comprising one or more trigger points.

5. The method according to claim 1, wherein said list of service messages comprises one or more SIP response messages, one or more redirection messages, one or more error messages, and/or one or more SIP response messages from the SIP response code classes 3xx and 5xx.

6. The method according to claim 1, wherein said control action comprises the step of checking whether said service message comprises an allowable destination.

7. The method according to claim 1, wherein said control action comprises the step of checking whether the destination in said service message is listed in a whitelist or a blacklist stored in either the memory of said stateless application server or in a database connected to said stateless application server.

8. The method according to claim 5, wherein said control action further comprises the step of initiating a session by using a SIP Request message in response to a received SIP response message or by replacing the received SIP response message with another SIP response message.

9. The method according to claim 1, wherein said list of service messages comprises at least one SIP request message, and wherein said control action further comprises the step of comparing the contents of a FROM field with contents of a P-Asserted-Identity field of a SIP request message received by said stateless application server.

10. A stateless application server for use in a service provisioning network, the stateless application server being configured to control service messages, the server comprising:
    means for receiving a service message from a serving network node associated with a user terminal, the user terminal comprising one or more VoIP services;
    means for initiating a session using a SIP Request message in response to a received SIP response message;
    a memory comprising one or more pre-configured service messages, one or more SIP response messages, one or more redirection messages and/or one or more error messages, and/or one or more SIP response messages from the SIP response code classes 3xx and 5xx;
    means for initiating a control action in response to a receipt of a service message at said stateless application server, if said service message, after being received at the stateless application server, matches a service message stored in said memory.

11. The stateless application server according to claim 10, said server further comprising:
    means for replacing the received SIP response message with another SIP response message.

12. The stateless application server according to claim 10, wherein said list of service messages further comprises at least one SIP request message, said server further comprising:
    means for comparing the contents of a FROM field with contents of a P-Asserted-Identity field of a SIP request message received by said stateless application server.

13. A system for controlling service messages in a service provisioning network comprising a stateless application server, wherein the stateless application server comprises:

means for receiving a service message from a serving network node associated with a user terminal, the user terminal comprising one or more VoIP services;

means for initiating a session using a SIP Request message in response to a received SIP response message;

a memory comprising one or more pre-configured service messages, one or more SIP response messages, one or more redirection messages and/or one or more error messages, and/or one or more SIP response messages from the SIP response code classes 3xx and 5xx;

means for initiating a control action in response to a receipt of a service message at said stateless application server, if said service message, after being received at the stateless application server, matches a service message stored in said memory; and wherein the service provisioning network is connected to at least one user terminal, wherein the user terminal comprises one or more VoIP services, and wherein said service provisioning network is further connected to the stateless application server.

14. A computer program product for controlling service messages in a service provisioning network, the computer program product comprising software code portions stored in a computer readable memory and configured to execute the method of:

retrieving, in response to a registration message, service routing information associated with a first user terminal, the service routing information being arranged to route at least one service message associated with said first user terminal via a stateless application server, said stateless application server being adapted to perform at least one control action on said service message, wherein the stateless application server is triggered to perform a control action if a service message received by the stateless application server matches a service message listed in a pre-configured list of service messages, said list being stored in a memory of said stateless application server or in a database connected to said stateless application server.

15. The computer program product according to claim 14, further configured to execute the method of:

selectively preventing registration of the user terminal to one or more application servers connected to the service provisioning network, said application servers comprising one or more services corresponding to the services comprised in said user terminal.

16. The computer program product according to claim 14, further configured to execute the method of: routing one or more SIP messages via said stateless application server, said SIP messages being arranged for establishing a session associated with a VoIP service.

17. A computer program product for controlling service messages in a service provisioning network, the computer program product comprising software code portions stored in a computer readable memory and configured to execute the method of:

receiving a service message from a serving network node associated with a user terminal, the user terminal comprising one or more VoIP services;

initiating a session using a SIP Request message in response to a received SIP response message; and initiating a control action in response to a receipt of a service message at a stateless application server, if said service message, after being received at the stateless application server, matches a service message stored in a memory, the memory comprising one or more pre-configured service messages, one or more SIP response messages, one or more redirection messages and/or one or more error messages, and/or one or more SIP response messages from the SIP response code classes 3xx and 5xx.

* * * * *